March 6, 1928.  1,662,034
C. H. RICHTER
RECEIPT RECORDER
Filed Aug. 21, 1926   2 Sheets-Sheet 1
Fig.1,
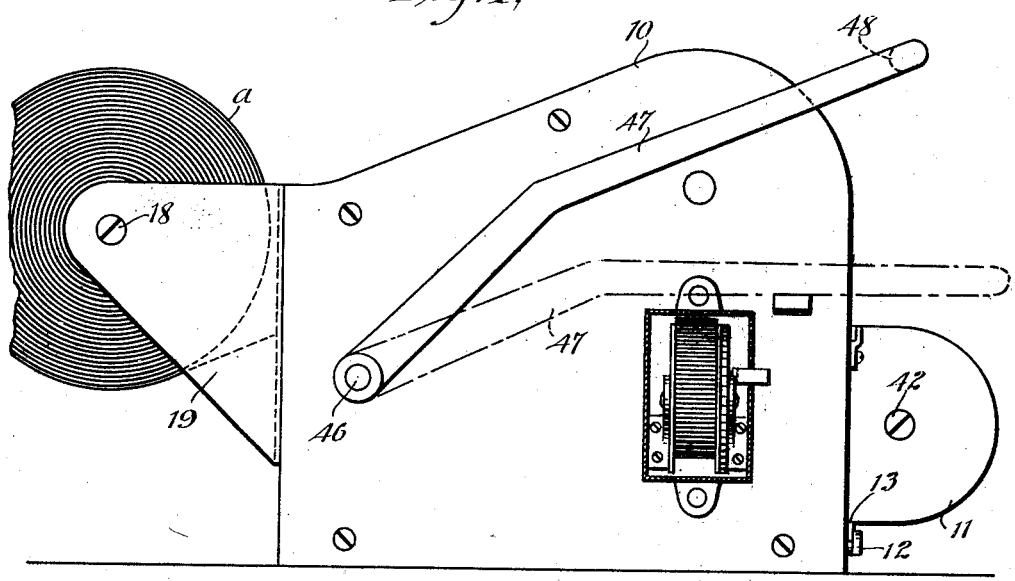
Fig.2,
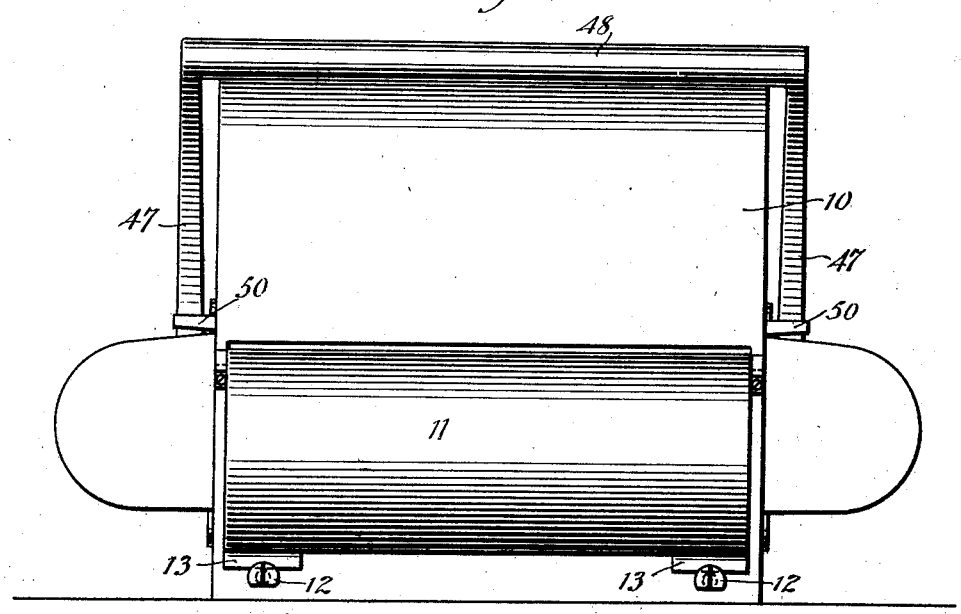
WITNESSES
Edw. Thorpe
John McAuliffe
INVENTOR
C. H. Richter
BY Munn & Co
ATTORNEYS March 6, 1928.
C. H. RICHTER
RECEIPT RECORDER
Filed Aug. 21, 1926
1,662,034
2 Sheets-Sheet 2
Fig. 3,
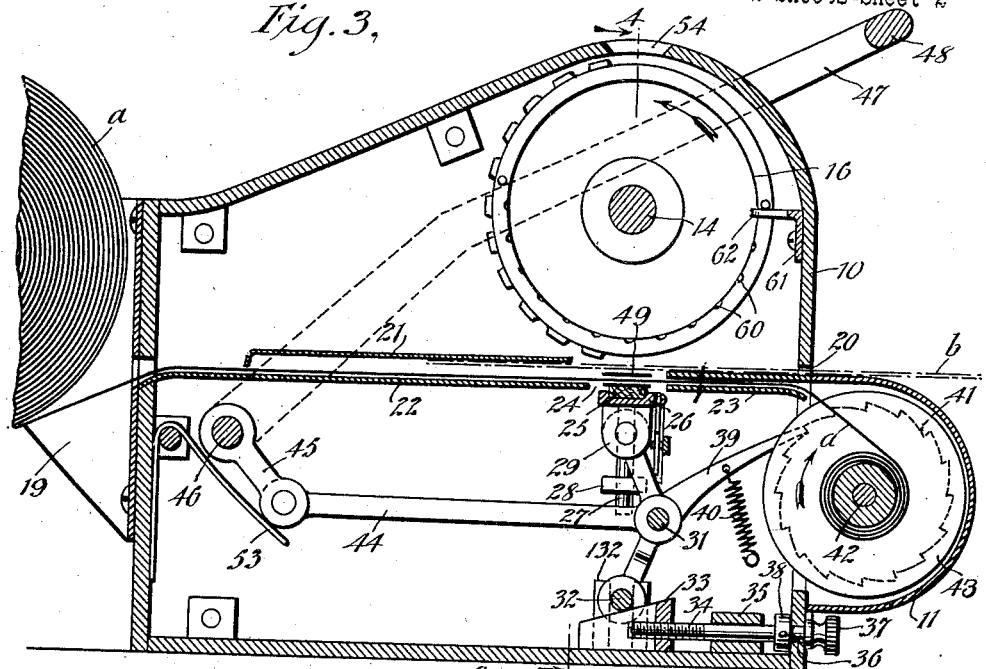
Fig. 4,
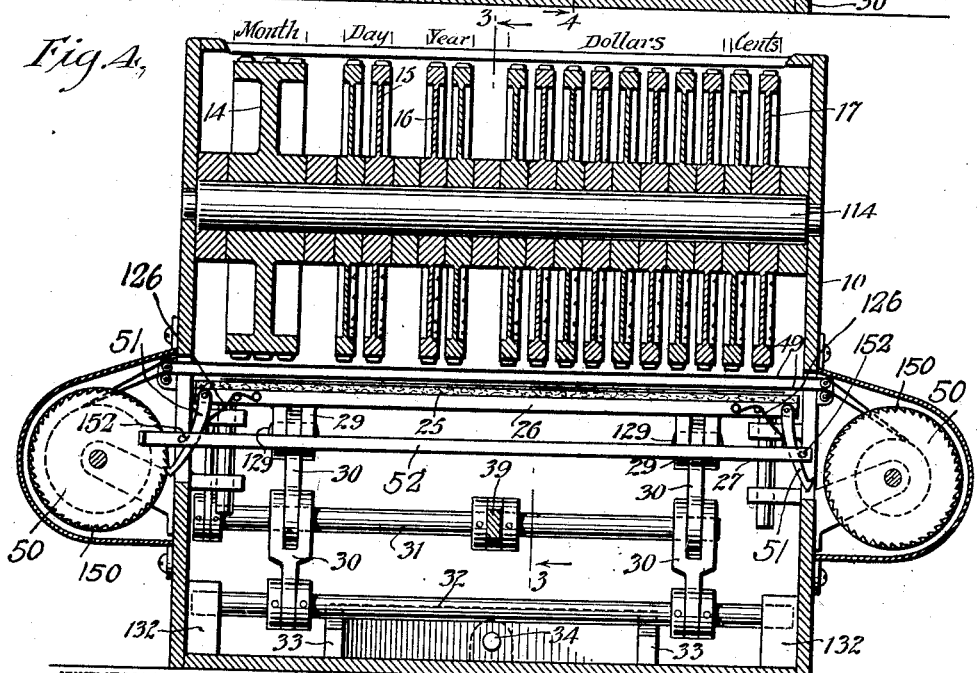
Fig. 5.
WITNESSES
INVENTOR
C. H. Richter
BY
ATTORNEYS Patented Mar. 6, 1928.

1,662,034

UNITED STATES PATENT OFFICE.

CHARLES H. RICHTER, OF TRINIDAD, COLORADO.

RECEIPT RECORDER.

Application filed August 21, 1926. Serial No. 130,728.

My invention relates to a device whereby a receipt may be inserted to the interior of a casing to a manually controlled printing apparatus to receipt the bill, the device including means to record on a strip the amount for which the bill is receipted and the date.

The general object of my invention is to provide a device for the indicated purpose, simple in construction, positive in operation, and easy of manipulation, as well as to provide means to adjust the recording mechanism to insure precision of operation.

Reference is to be had to the accompanying drawings forming a part of this specification, it being understood that the drawings are merely illustrative of one example of the invention.

Figure 1 is a side elevation of a receipt recorder embodying my invention;

Figure 2 is a front elevation;

Figure 3 is a transverse vertical section on the line 3—3, Figure 4;

Figure 4 is a section at right angles to Figure 3 as indicated by the line 4—4, Figure 3;

Figure 5 is a fragmentary view in elevation of a portion of the device to prevent undue movement of the printing wheels.

In carrying out my invention in accordance with the illustrated example, a suitable casing 10 is provided and a detachable auxiliary casing 11 at the front near the bottom removably held by screws 12, for example, said screws being shown with a flattened side so that a half turn will permit the removal of the casing 11, said screws engaging a depending flange 13 on said casing 11.

At the upper portion of the casing is a series of printing wheels, there being a printing wheel 14 for the month and mounted on a shaft 114. Also on the shaft 114 are two wheels 15 for the day of the month, and two wheels 16 for the year. In addition there are ten wheels 17 for dollars and cents, it being understood that the number of wheels may vary according to the capacity of the device.

A drum 18 is provided on brackets 19 to receive a roll of recording strip $a$. A bill to be receipted is indicated in dot and dash lines at $b$ in Figure 3 adapted to be inserted through a slot 20 and beneath a shield 21 over a table 22 in casing 10. A tube section 23 is rigid with detachable casing 11 and is separated from table 22 and shield 21 by an opening 24. At opening 24 is a vertically movable pad 25 here shown as on a support 26 having depending pins 27 movable in brackets 28. On the supporting bar 26 at the under side are spaced pairs of ears 29 to which the upper members of toggle links 30 are secured by pivots 129. Said toggle links are pivotally connected at the joints thereof to a transverse rod 31 operated as hereinafter described. The lower ends of toggle links 30 are pivoted to a fixed shaft 32 vertically movable in guides 132.

The shaft 32 rests on the inclined top surface of an adjusting element 33 movable by a screw 34 which passes through guide 35 in casing 10. Said screw 34 is swivelled to the front wall of the casing 10 by screw head 37 and a collar 38 at opposite sides of said wall.

On rod 31 is a pawl 39 which engages a ratchet wheel 41 on the drum 43 turning about the shaft 42 onto which drum 43 the strip $a$ winds from drum 18 after passing over table 22 and through tube 23. The pawl 39 is under the action of a retractile spring 40. Rod 32 has pivotal connection with one end of a connecting rod 44, the opposite end of which is pivoted to an arm 45 on a shaft 46, which shaft 46 is pivoted to a manually operable means to rock said shaft, said means consisting in the illustrated example of side arms 47 united by a cross handle 48.

Two typewriter ribbons 49 are disposed transversely at the opening 24 beneath the printing wheels 14 to 17. Said typewriter ribbons may have any suitable means for positioning the same and for permitting shifting of the ribbon to present a new surface of the printing wheels. I have shown drums 50 and ratchets 150 disposed at opposite sides of casing 10, on to which drums the ribbons 49 wind. Said ratchets 150 are adapted to be respectively engaged by a pawl 51 disposed adjacent the drum 50. Pawls 51 are pivoted to the support 26. A bar 52 is provided having pins 152 adjacent pawls 51, said bar 52 being manually shiftable lengthwise to cause pins 152 to shift pawls 51 so that one pawl engages adjacent ratchet 150 while the other pawl is disengaged from its ratchet. Springs 126 on support 26 tend to throw the pawls 51 into engagement with the respective ratchets 150.

With the above described construction, a depression of the handle 48 and side arms 47 will rock shaft 46 and its crank arm 45 which will move connecting rod 44 longitudinally in a direction to cause toggle links 30 to lift pad 25 and typewriter ribbon 49 to press the bill b against the wheels numbered 14 to 17. The type wheels 14, 15, 16, and 17 do not press directly upon the bill but the upper ribbon 49 causes a negative print to be made on the under side thereof, while the recording strip a will receive a positive print upon its upper side and a negative impression on its lower side. Any other suitable arrangement of ribbons may be provided. With the return movement of connecting rod 44 and shaft 31, pawl 39 will turn drum 43 one tooth of ratchet wheel 41. A plate spring 53 engaging crank arm 45 restores rod 44 and side arms 47 with cross bar 48. The wheels 14 to 17 are accessible through a slot 54 in casing 10 and said wheels may therefore be shifted daily.

The various wheels (14 to 17) are formed with an annular series of notches adjacent the periphery as at 60 and a toothed bar 61 is positioned transversely to the wheels and adjacent thereto, the fingers 62 of which spring into said notches to prevent undue movement of the wheels.

I would state furthermore that while the illustrated example constitutes a practical embodiment of my invention, I do not limit myself strictly to the exact details herein illustrated, since, manifestly, the same can be considerably varied without departure from the spirit of the invention as defined in the appended claims.

Having thus described my invention, I claim:

1. A receipt recorder including a casing having a slot for the entrance of a bill to be receipted, means within the casing to hold an entered receipt, a table to sustain the receipt, a series of printing wheels for stamping the date and amount of the payment, a pad mounted adjacent to the wheels, means to reciprocate said pad to and from the wheel for printing the receipt, a drum adapted to mount a recording strip, means to guide said recording strip over the pad, means to effect printing on the strip as well as on the bill, and means to wind the strip after printing.

2. A receipt recorder including a casing having a slot for the entrance of a bill to be receipted, means within the casing to hold an entered receipt, a table to sustain the receipt, a series of printing wheels for stamping the date and amount of the payment, a pad mounted adjacent to the wheels, means to reciprocate said pad to and from the wheel for printing the receipt, a drum adapted to mount a recording strip, means to guide said recording strip over the pad, means to effect printing on the strip as well as on the bill, and means to wind the strip after printing; together with means to adjust the reciprocating means to bring about accuracy of printing.

3. A receipt recorder including a casing, means to position an entered bill to be receipted, and sustain the same for printing, a series of printing wheels, a pad mounted for movement against the wheels and away from the wheels, and means to cause reciprocating movement of the pad; together with means to actuate and print upon a record strip simultaneously with the receipting of the bill.

4. In a device of the class described, a series of printing wheels, a reciprocating element adapted to coact with said printing wheels to effect the printing, toggle links to reciprocate said element, a manually depressible means, and operative connections between said depressible means and said toggle links; together with a pawl movable by the movements of said toggle links, a winding drum, a ratchet wheel associated with said drum to turn the same and engageable by said pawl, a drum to hold a record strip, and means to guide said strip from the second mentioned drum to said winding drum.

5. In a device of the class described, a series of printing wheels, a reciprocating element adapted to coact with said printing wheels to effect the printing, toggle links to reciprocate said element, a manually depressible means, and operative connections between said depressible means and said toggle links; together with a slidable adjusting element having an inclined top in contact with the toggle links, and means to move said adjusting element for varying the movements of the toggle links.

CHARLES H. RICHTER.